J. H. HOGDIN, A. Z. COATS AND L. M. MILLER.
COTTON SCRAPER.
APPLICATION FILED DEC. 10, 1919.
1,358,208.
Patented Nov. 9, 1920.
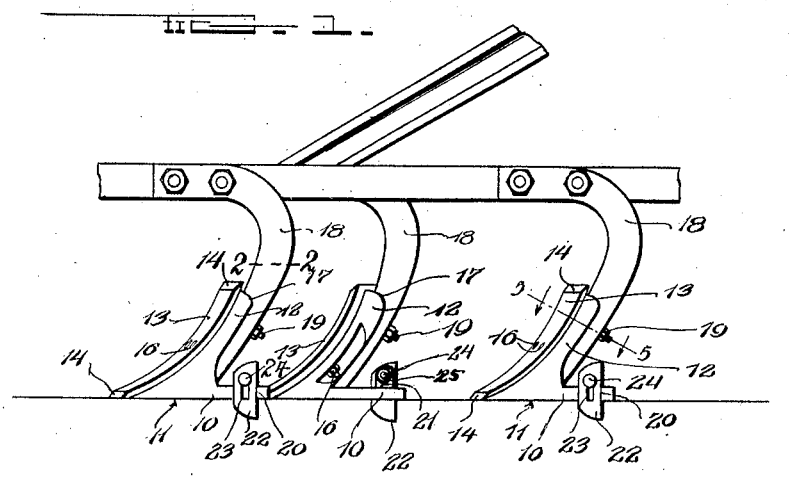
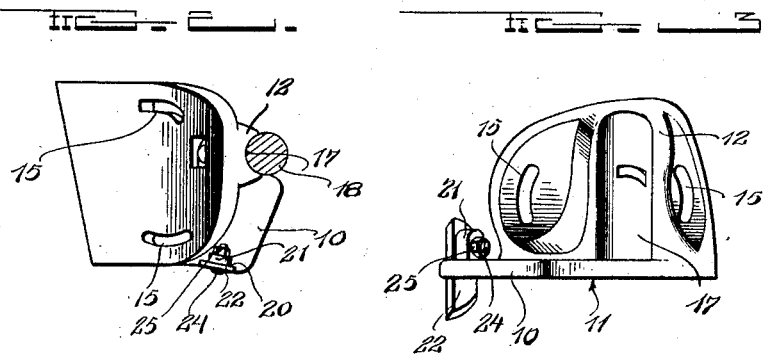
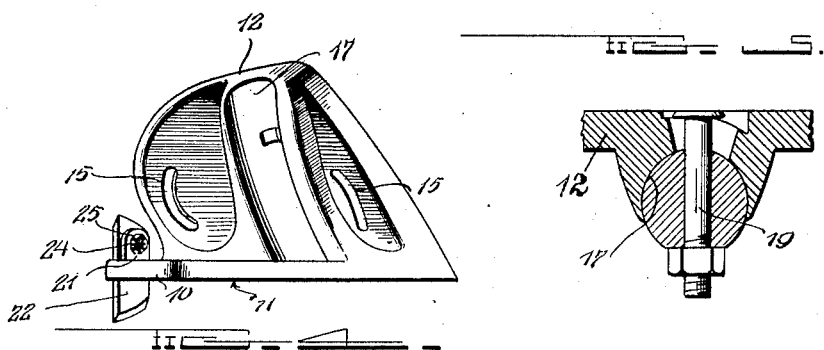
Inventor
John H. Hogdin
Arizonia Z. Coates
Leonard M. Miller
By Geo. F. Kimmel
Attorney

UNITED STATES PATENT OFFICE.

JOHN H. HOGDIN, ARIZONIA Z. COATS, AND LEONARD M. MILLER, OF NEWBERN, TENNESSEE.

COTTON-SCRAPER.

1,358,208.  Specification of Letters Patent.  Patented Nov. 9, 1920.

Application filed December 10, 1919. Serial No. 343,773.

*To all whom it may concern:*

Be it known that we, JOHN H. HOGDIN, ARIZONIA Z. COATS, and LEONARD M. MILLER, citizens of the United States, residing at Newbern, in the county of Dyer and State of Tennessee, have invented certain new and useful Improvements in Cotton-Scrapers, of which the following is a specification.

This invention relates to scraper attachments to the standards of cultivators and the like, and has for one of its objects to increase the efficiency and utility of devices of this character.

Another object of the invention is to provide a device of this character which may be readily adapted without material structural change to cultivator standards and like devices of various forms and sizes.

With these and other objects in view, the invention consists in certain novel features of construction as hereinafter shown and described and then specifically pointed out in the claim, and in the drawings illustrative of the preferred embodiment of the invention.

Figure 1 is a side elevation of a portion of a conventional cultivator frame including a plurality of standards with the improved scraper devices attached.

Fig. 2 is a plan view of one of the attachments without the scraper blades and with the standard in section on the line 2—2 of Fig. 1.

Fig. 3 is a rear elevation.

Fig. 4 is a perspective view, from the rear, of the improved attachment.

Fig. 5 is an enlarged sectional detail on the line 5—5 of Fig. 1.

The improved device is designed to be attached to the standard portion of a cultivator or like implement in place of the ordinary cultivator blades or shares, and for scraping the soil in the neighborhood of growing plants, more particularly of cotton plants, and comprises supporting members formed rights and lefts, and each including a base or ground engaging portion 10 having a flat horizontal lower face 11 and an upstanding portion 12, preferably integral with the base, and directed obliquely thereto and also at an angle to its longitudinal axis. The forward face of the upstanding portion 12 in convex or curved to conform to the curvature of the ordinary cultivator blade, plow share, or mold board, and is designed to support a cutting or scraping blade represented as a whole at 13.

The blade 13 is in parallelogram form with its upper and lower edges knife edged as shown at 14.

The upstanding portion 12 of the support is provided with segmental slots 15 through which binding bolts 16 pass from the blade 13. By this means the blade 13 is secured adjustably in position upon the supporting body to enable it to be set to operate at any desired angle.

The apertures in the blade 13 for the bolts 16 are disposed midway of the cutting edges 14 so that the blade may be reversed in position to bring either cutting edge to bear. Thus when one edge becomes dulled, the blade can be quickly reversed to bring the other cutting edge into action. Thus the life of the blade is doubled, as will be obvious.

Formed in the rear face of each of the upstanding portions 12 is a socket 17 to receive the standards 18 of the cultivator or other implement, and secured detachably in place by a bolt 19 or other suitable fastening device.

The supporting member 10—12 and its blade 13 thus replaces the ordinary shovel or moldboard of a cultivator or like implement.

The socket 17 is shown semi-circular to receive the circular foot of the standard, but it will be obvious that the shape of the socket may be modified to adapt the device to other forms of standards without departing from the principle of the invention.

Formed in one side edge of the base portion 10 is a recess or seat 20, and rising from the upper face of the portion 10 is an attaching lug 21, the outer face of the lug being flush with the inner wall of the seat. Engaging in the seat 20 is a vertical slotted blade 22 having a longitudinally extending slot 23 to receive a clamp bolt 24 which also passes through the lug and provided at its inner end with a clamp nut 25. By this means the blades 22 may be adjusted vertically relative to the base 10 within the range of the slots 23.

The recesses are formed in the outer edges of the base portions or in the right side edge of one base portion and in the left side edge of the other base portion as shown.

The blades 22 fit closely in the seats 20 and are guided and supported thereby, the ends of the seats coacting with the bolts 24 to prevent the displacement of the blades under the strains to which they are subjected when in use.

The ends of the blades 22 are curved and sharpened, as shown and the blades are reversible both end for end and face for face. By this means the blades may be turned end for end when one cutting edge is dulled, and also reversible face for face to cause the cutting portion which for the time being is presented downwardly to be arranged to operate at a downward and rearward angle or at an upward and rearward angle, as required.

The blade 22 operates in a twofold capacity; first as a cutter to enter the ground below the lower line of the base portion and define more clearly the line of operation of the scraper blades 13, but also as a land side to guide or control the direction of the scraper.

The improved device it will be noted, includes a double acting scraper blade 13 and a double acting guideway blade 22.

The lower face of the base portion 10 is relatively broad and long presenting a large bearing surface to insure steadiness and stability of the scraping action, and increasing the accuracy of the operation when used on trashy or hard land.

The blades 13 can be set to operate at any desired angle or at any required depth. A slot 26 is formed through the portion 12 of the attachment and communicating with the socket 17, to receive the clamp bolt 19, the outer portion of the slot enlarged as shown at 27; the bottom of the enlargement being curved to correspond to the curvature of the socket 17, to receive the head 28 of the bolt 19, as shown in Fig. 5.

By this means the attachment may be adjusted upon the standard 18 and clamped in the adjusted position.

The preferred embodiment of the invention is disclosed in the drawings and set forth in the specification, but it will be understood that any modifications within the scope of the claims may be made in the construction without departing from the principle of the invention or sacrificing any of its advantages.

What is claimed is:

The combination with a standard of a cultivator having a cylindrical lower portion of a supporting member including a base portion having a flat horizontal lower ground engaging face and an upstanding portion having its forward face directed obliquely to the horizontal face of the base and with a socket semicircular transversely for rotatably receiving said standard, clamping means for adjustably coupling said supporting member to the standard, a scraping blade bearing against the upstanding portion of the supporting member, and means for adjustably coupling the blade to said upstanding portion.

In testimony whereof we hereunto affix our signatures.

JOHN H. HOGDIN.
ARIZONIA Z. COATS.
LEONARD M. MILLER.